W. CARTER.

Bee House.

No. 84,994.

Patented Dec. 15, 1868.

W. CARTER, OF ST. LOUIS, MISSOURI.

Letters Patent No. 84,994, dated December 15, 1868.

IMPROVEMENT IN BEE-HOUSES.

The Schedule referred to in these Letters Patent and making part of the same.

*To all whom it may concern:*

Be it known that I, W. CARTER, of the city and county of St. Louis, State of Missouri, have invented a new and useful Improvement in Bee-House; and I do declare the following to be a full and exact description of the same, referring to accompanying drawings, forming part of this specification.

Figure 1:
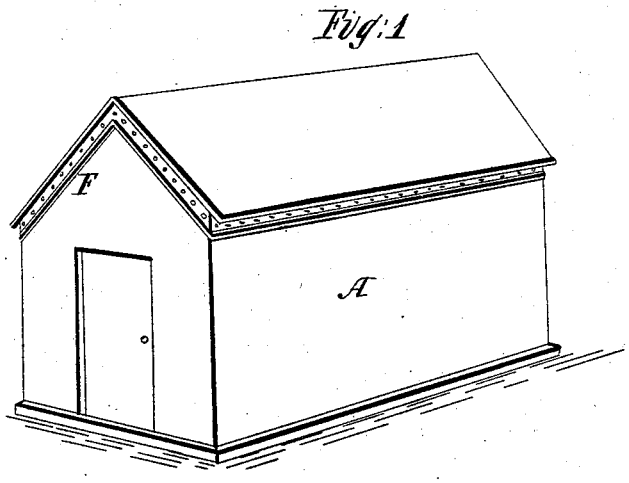
Figure 2:
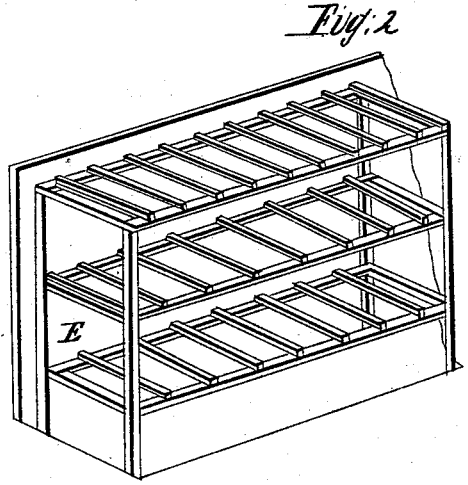

Figure 1 represents a perspective view of Carter's bee-house, with a door large enough to admit a person, and holes all around under the roof, to admit the bees, marked F.

This house is made perfectly warm and tight, and may be made of any size.

The holes, to admit the bees, may be made at the top or the bottom, or at both places.

The inside is furnished with shelves, made of slats, upon which the bee will make the honey. These shelves may be three or more in number, passing on each side, and, in some cases, through the centre of the house. They should be at least three feet from the floor, more or less, and three feet apart, and, in all cases, they should be so constructed as to enable the person entering the door to clean them of the moth or other insects, and sweep out the house.

Figure 4 shows the inside structure of one side of this bee-house, with the shelves, made of slats, marked E.

This house not only enables the tender to keep out the bee-insect, but will prevent swarming of the bees.

To introduce the bees into my bee-house, take a swarm of bees in a common gum, and place it on one of the shelves, as above described. The bees, after having filled the gum, will commence on the slats E, and fill them on every side. After they have fairly filled the slats around the gum, it must be removed, first driving the bees therefrom, in the usual way.

Now, what I claim, and for which I ask Letters Patent of the United States to be granted to me, is—

The combination of the bee-house A with the slats, so as to obviate the necessity of a gum; the injury caused by the bee-moth; the swarming of the bees; and to secure easy access to the honey.

W. CARTER.

Witnesses:
   WM. M. ECCLES,
   ROBERT R. KESTEVEN.